(12) United States Patent
Gaddis et al.

(10) Patent No.: US 11,978,098 B2
(45) Date of Patent: May 7, 2024

(54) MANAGING REDISTRIBUTION OF DIGITAL MEDIA ASSETS

(71) Applicant: Apple Inc., Cupertino, CA (US)

(72) Inventors: Matthew W. Gaddis, Milpitas, CA (US); Jeremy J. Templier, Camas, WA (US)

(73) Assignee: Apple Inc., Cupertino, CA (US)

(*) Notice: Subject to any disclaimer, the term of this patent is extended or adjusted under 35 U.S.C. 154(b) by 571 days.

(21) Appl. No.: 16/856,545

(22) Filed: Apr. 23, 2020

(65) Prior Publication Data

US 2020/0349541 A1 Nov. 5, 2020

Related U.S. Application Data

(60) Provisional application No. 62/841,246, filed on May 1, 2019.

(51) Int. Cl.
*G06Q 30/0601* (2023.01)

(52) U.S. Cl.
CPC ..... *G06Q 30/0601* (2013.01); *G06Q 30/0621* (2013.01); *G06Q 30/0635* (2013.01); *G06Q 30/0641* (2013.01); *G06Q 2220/00* (2013.01); *G06Q 2220/16* (2013.01)

(58) Field of Classification Search
CPC .......................................... G06Q 30/06–0643
See application file for complete search history.

(56) References Cited

U.S. PATENT DOCUMENTS

| | | | |
|---|---|---|---|
| 9,021,608 B2 | 4/2015 | Rogel et al. | |
| 9,465,924 B2 | 10/2016 | Qu et al. | |
| 10,666,599 B2 | 5/2020 | Ande et al. | |
| 10,701,079 B1* | 6/2020 | Ledet | H04L 63/102 |
| 2011/0302009 A1 | 12/2011 | Freed et al. | |
| 2015/0086183 A1* | 3/2015 | Sterchi | G11B 27/34 |
| | | | 386/286 |
| 2016/0351062 A1 | 12/2016 | Mathews et al. | |
| 2018/0330756 A1* | 11/2018 | MacDonald | G06F 16/951 |
| 2020/0167494 A1* | 5/2020 | Ozer | G06F 16/176 |
| 2020/0244470 A1* | 7/2020 | Ruckriemen | H04L 9/3236 |
| 2022/0173893 A1* | 6/2022 | Basu | H04L 9/3255 |
| 2022/0215076 A1* | 7/2022 | Goldston | G06F 16/61 |

* cited by examiner

*Primary Examiner* — Jay Huang
(74) *Attorney, Agent, or Firm* — Invoke

(57) ABSTRACT

In some implementations, a computing device may obtain an original digital media asset published to a server device along with a distributed ledger that tracks ownership of the original digital media asset. The computing device may generate a customized digital media asset that replaces the original digital media asset, and modify the distributed ledger to indicate the customization or modification of the original digital media asset and identify the customized digital media asset and the ownership thereof. The computing device may publish the customized digital media asset to a server device for distribution. Upon transfer of ownership of the customized digital media asset to a new owner, the distributed ledger may be modified to indicate the new ownership of the customized digital media asset.

20 Claims, 10 Drawing Sheets

Ledger

| | Title | Name | ID | Timestamp | Modified? | Opened? | ... |
|---|---|---|---|---|---|---|---|
| 402 { | Someday | Melissa Scott | 034RT745 | 02/28/2018 | No | No | ... |
| | The Fourth | Sam Gagner | 00001776 | 07/04/2017 | No | No | ... |
| | Red & Blue | Mary Thomas | 56THS4O23 | 09/30/2015 | No | No | ... |
| | Upward | John Scott | 43FR32SW7 | 05/15/2018 | No | Yes | ... |
| ⋮ | | | | | | | |
| 404 → | Limelight | Amy | AA00ZZ99 | 01/01/2019 | No | Yes | ... |
| 406 → | Limelight (Signed) | Amy | BA00ZZ99 | 04/01/2019 | Yes | No | ... |
| ⋮ | | | | | | | |
| | Title | Name | ID | Timestamp | Y/N | Y/N | ... |

*FIG. 4*

MANAGING REDISTRIBUTION OF DIGITAL MEDIA ASSETS

RELATED APPLICATIONS

This application claims the benefit of the filing date of U.S. Provisional Patent Application No. 62/841,246, filed on May 1, 2019, which is incorporated herein by reference.

TECHNICAL FIELD

The disclosure generally relates to managing digital media assets, and more particularly to creating, purchasing, modifying, and selling digital media assets.

BACKGROUND

Many forms of digital media assets, like electronic books ("eBooks"), magazines, music, movies, etc., are purchased online through marketplaces that sell such digital properties. These digital media assets are typically purchased through a digital storefront, with many different digital storefronts acting as distributors for publishers and authors of the digital media assets. Often, a digital storefront may provide certain types of digital media assets, and a purchaser may visit a particular digital storefront in order to obtain those certain types of digital media assets.

When a user purchases a digital media asset, the digital rights to use the digital media asset are being transferred from the seller to the purchaser to allow the purchaser to use the digital media asset. The length of time in which this transfer remains in effect, and any additional uses and/or actions that are being provided to the purchaser may vary depending on different factors, such as the type of digital media asset, the digital storefront selling the digital media asset and transferring the rights, etc. The price that the customer pays for the digital media asset is set by the digital storefront from which the digital media asset is chosen to be purchased, and does not change regardless of how numerous or how few copies of the digital media asset are sold.

SUMMARY

In some implementations, a computing device may obtain an original digital media asset published to a server device along with a distributed ledger that tracks ownership of the original digital media asset. The computing device may generate a customized digital media asset that replaces the original digital media asset, and modify the distributed ledger to indicate the customization or modification of the original digital media asset and identify the customized digital media asset and the ownership thereof. The computing device may publish the customized digital media asset to a server device for distribution. Upon transfer of ownership of the customized digital media asset to a new owner, the distributed ledger may be modified to indicate the new ownership of the customized digital media asset.

Particular implementations provide at least the following advantages. Customized or personalized digital media assets may be endowed with a certain rarity, as they are unique from the other published digital media assets available on the server device. In addition, the rarity of such assets may be further enhanced by indicating whether such an asset has been opened (e.g., read, viewed, played, etc.) or not. Also, a secure ledger system is provided that tracks modifications to digital media assets using distributed ledgers that allow for privately storing ownership of such assets.

Details of one or more implementations are set forth in the accompanying drawings and the description below. Other features, aspects, and potential advantages will be apparent from the description and drawings, and from the claims.

DESCRIPTION OF DRAWINGS

FIG. 4 shows an example ledger.

Like reference symbols in the various drawings indicate like elements.

DETAILED DESCRIPTION

Figure 1:
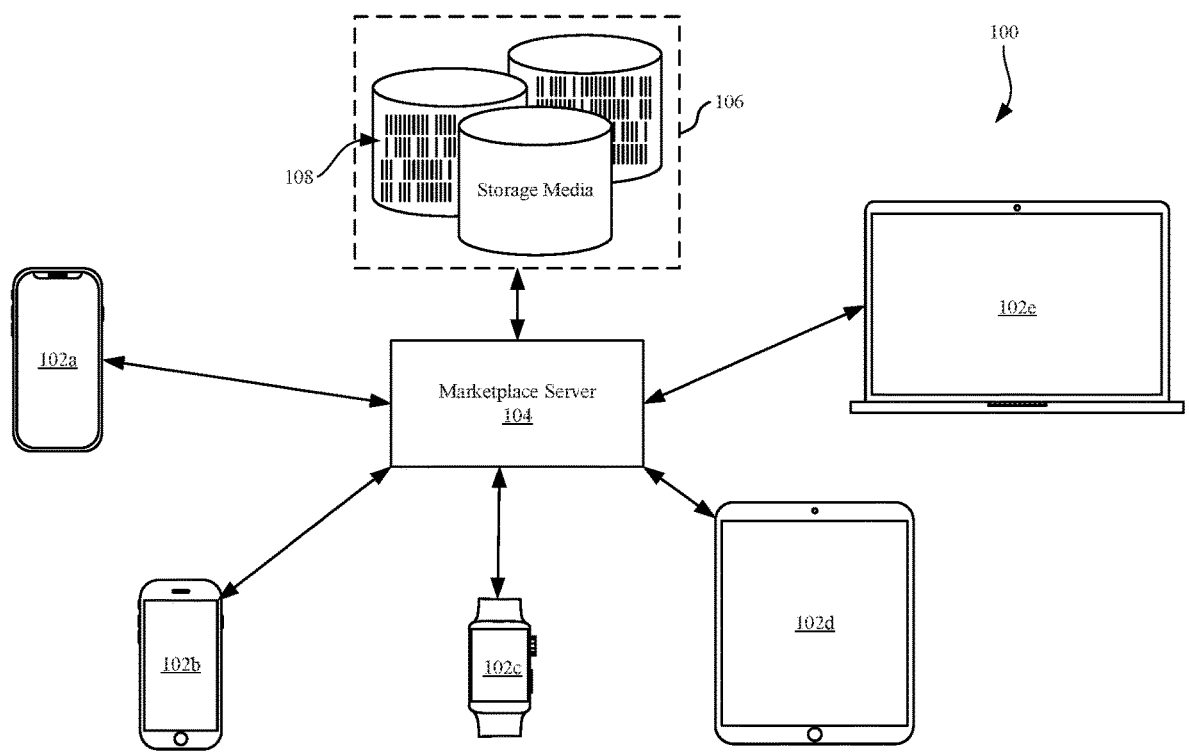
FIG. 1 is a block diagram of an example system for managing redistribution of digital media assets.

The amount of copies that are available for digital media assets, like electronic books ("eBooks"), magazines, music, movies, etc., are not typically limited. A digital storefront may sell as many copies of a digital media asset as there are customers willing to purchase. In other words, in conventional use, a digital media asset is a boundless commodity and the supply of such assets may never run out. While the description that follows describes the technology disclosed herein using eBooks as the example digital media asset, the features of the technology disclosed herein may be applied to other types of digital media assets, such as magazines, music, movies, videos, audio books, and/or other digital media asset types.

An eBook, as used herein, is a term that describes a written publication made available in digital form. An eBook may comprise text, images, videos, and/or interactive elements that are viewable and/or controllable on a display of an electronic device that is configured with a reading application capable of understanding the particular eBook format. An eBook may comprise a file, a package, a packet, a link to a source location, or some other data format or collection of data known in the art. Moreover, changes to an eBook may be included in accordance with a change log or some other format for tracking modifications to an original eBook, possibly in metadata that accompanies the eBook or in some other location accessible by devices accessing the eBook. Some eBooks have physical printed counterparts, while some are only available as digital publications.

In one example, assume that an author named Amy writes a novel titled "Limelight" that she wants to have published as an eBook. Amy makes an agreement with an online marketplace to digitally distribute her eBook to whomever wants to purchase Limelight online. However, Amy also wants to have a few special instances of the eBook available that have been digitally signed by Amy herself (or in some other way customized by Amy), and to limit the number of these customized eBooks sold to only ten instances (or some other limited amount). Amy's autographed Limelight eBooks will be different from the publicly available instances of the original Limelight eBook.

With conventional distribution of digital media assets, it would be difficult to manage these autographed eBook instances of Limelight. The rareness of these autographed Limelight eBooks may make them more desirable to collectors of rare books and fans of Amy, but without a mechanism to ensure that a consumer is receiving a bona fide one of the ten distributed special instances of Limelight, there may not be any tangible benefit for Amy due to this special interest. Because the number of original Limelight eBooks available to be sold are not conventionally limited, and there is no tracking system capable of ensuring that the autographed Limelight eBooks are limited to just ten instances sold, the rareness of the autographed Limelight eBooks would not be able to be ensured using conventional systems. It is also not possible for a purchaser of the autographed Limelight eBook to know that it is a genuine instance from the original ten instances available for sale by Amy, using conventional systems, and not a copy of one of those instances, or an original instance of the Limelight eBook that was modified by someone other than Amy.

Some physical media assets, such as a book autographed by the author, a script having director's notes inscribed therein, handwritten notes of a celebrity, an original piece of art, an original manuscript, etc., are highly sought after by collectors and other people interested in the people involved in the creative process of making these assets. In some cases, customized physical media assets may sell for far more than the price that they were originally purchased before being customized. However, in conventional use, digital media assets do not have the capability of attaining the rarity or uniqueness of these other physical media assets.

Any custom or personalized content that modifies a digital asset may be utilized in the systems and methods described herein. Moreover, the custom or personalized content may possibly increase a value of the digital asset, so that it is advantageous to track the ownership of such customized digital assets and ensure their provenance. These customized digital assets may be sought out by collectors or people who have a special interest in the person who customized the digital asset.

Returning to the example of Amy the author, in order to provide a system that is able to manage publication of the autographed Limelight eBooks, a distributed manner of publicly verifying modifications made to the original Limelight eBook is provided, in one approach. Moreover, in embodiments described herein, the original Limelight eBook may be modified and/or have content added to it by a purchaser, thereby rendering the original Limelight eBook as a new property (e.g., customized) different from the generally available instance that the public purchases from a digital storefront. Once a modified Limelight eBook is created, the purchaser may then resell the modified Limelight eBook to a different purchaser. This secondary market transaction may be made peer-to-peer, through a secondary market digital storefront, or via some other transaction method known in the art. Now, instead of purchasing the widely available original Limelight eBook, the second purchaser has obtained a singular version modified in a certain way.

FIG. 1 is a block diagram of an example system 100 for managing redistribution of digital media assets. With reference again to Amy the author, a marketplace server 104 may store at least one instance of the Limelight eBook to storage media 106, and offer a plurality of instances of the Limelight eBook for purchase. One or more users may use any user device 102 to interact with the marketplace server 104 in order to purchase an instance of the Limelight eBook.

System 100 may include a plurality of user devices 102 (such as smartphones 102a, 102b, a smartwatch 102c, a tablet computer 102d, and a laptop computer 102e) in electrical communication with the marketplace server 104. Any type of user device 102 (including those not specifically shown in FIG. 1) may be included in system 100, such as desktop computers, media devices like set-top boxes (STBs), digital streaming devices, e-readers, smart televisions (TVs), etc. Each user device 102 is configured to upload data to and download data from the marketplace server 104 through a network (e.g., WAN, LAN, the Internet, etc.), in one approach. In particular, the user devices 102 are capable of communicating with the marketplace server 104 to upload and download digital media assets, such as Amy's Limelight eBook.

In one approach, a user device 102 may include a digital media asset client for opening and managing digital media assets (such as an eBook reader, web browser, etc.), a marketplace client which is configured to communicate with the marketplace server 104 for displaying available digital media assets and manage transactions with the marketplace server 104, and a ledger client for managing a distributed ledger stored to the user device 102.

The marketplace server 104 is configured to store digital media assets 108 to one or more storage media 106. Any type of storage media 106, as would be known to one of skill in the art, may be used to store data, such as hard disk drives, optical drives, flash memory, tape drives, cloud storage, distributed storage, data centers, etc. The storage media 106 may be remote from the marketplace server 104, local to the marketplace server 104, distributed, tiered, virtual, or in any other way designed to effectively and efficiently store digital media assets 108 for use in transactions. The transactions may be performed via one or more digital storefronts that are hosted by the marketplace server 104 or some other intermediary platform that communicates with the marketplace server 104 to acquire and/or provide digital media assets 108.

The marketplace server 104 may save any number of digital media assets 108 to the storage media 106, limited only by the size of the storage media 106, and in some approaches by predetermined limits on how many different unique user devices 102 may be simultaneously managed by the marketplace server 104.

The marketplace server 104 may include a processor and logic configured to perform a set of instructions to manage digital media assets 108, the digital media assets 108 being received from user devices 102 and subsequently delivered to user devices 102 which have requested and been approved to receive such digital media assets 108.

Moreover, any type of digital media asset 108 may be stored on the storage media 106, received from user devices 102, and delivered to user devices 102. Examples of some possible digital media assets 108 include digital print assets, digital audio assets, digital images, and digital video assets. Digital print assets may include eBooks (e.g., electronic books), magazines, newspapers, comic books, educational materials, instructional guides and manuals, etc. Digital audio assets may include music, comedy routines, speeches, presentations, etc. Digital images may include artwork, sketches, album art, book art, book jacket covers, movie posters, etc. Digital video assets may include movies, films, amateur and user-provided videos, comedy sketches and routines, documentaries, product launches, etc. This is a non-exhaustive list of possible types of digital media assets 108 that may be used in system 100.

FIGS. 2A-2D show an example system 200 for managing redistribution of digital media assets. In system 200, digital media assets are represented as eBooks. However, the descriptions of FIGS. 2A-2D are not limited to only eBooks, and any type of digital media asset may be used in conjunction with the descriptions of these figures as would be understood to one of skill in the art.

Figure 2A:
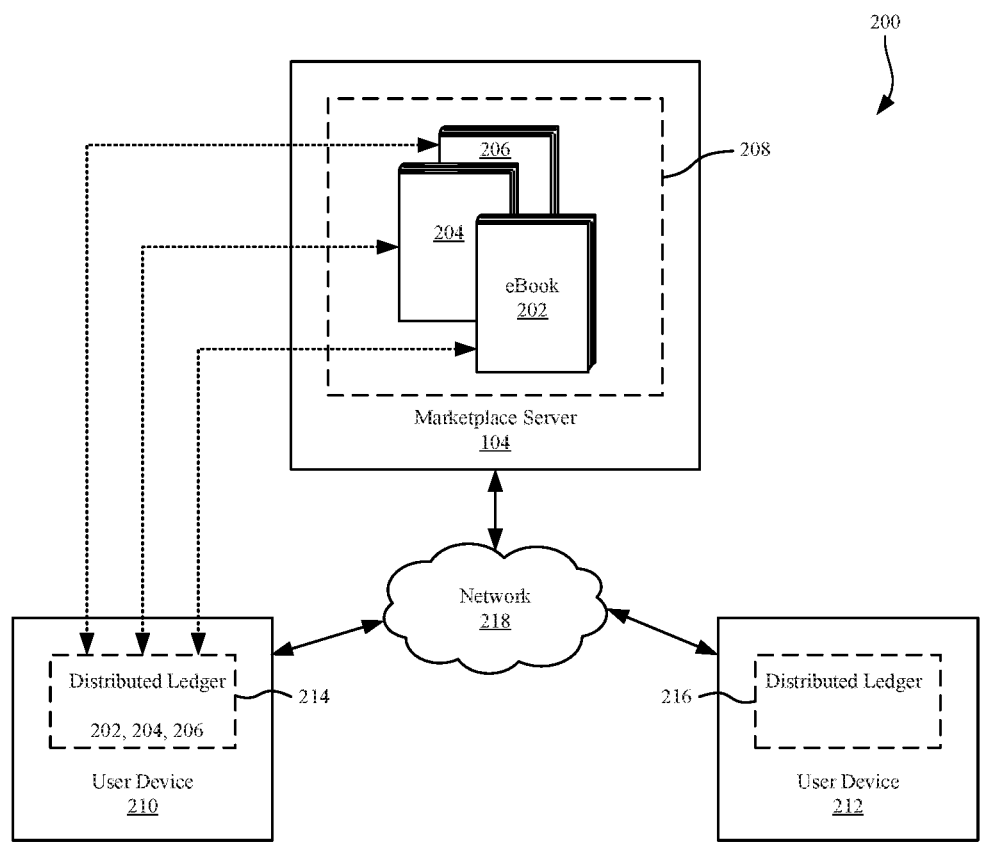
FIGS. 2A-2D show an example system for managing digital media assets.

FIG. 2A is a block diagram of system 200 that includes two user devices. For example, system 200 may include user device 210 and user device 212. These user devices are in communication with the marketplace server 104, either directly or via a network 218. Referring again to Amy the author, the original Limelight eBook may be available for purchase from the marketplace server 104 by either of the user devices.

Each user device includes a distributed ledger that is configured to store information related to some or all eBooks and other digital media assets available in system 200. Moreover, in one approach, digital media assets that a particular user has ownership of and/or has been granted access to by the marketplace server 104 are included in the distributed ledger of the user's device(s).

To enable a user to access eBooks and other digital assets that the user has ownership of, a user account may be associated with the user, in one approach. The user account identifies the user and associates the user to various user devices. A unique user account identifier may also be associated with the user account for identifying the specific user on any user device. Moreover, the user account identifier may be used to verify that a user device is allowed to access a particular eBook (because it is being used by a user who is allowed access), even if that user device has not accessed the particular eBook previously. In this way, a user may access various eBooks and other digital media assets in system 200 over which the user has ownership using any user device by identifying the user account which indicates the ownership.

A network 218 may be used to connect the user devices 210, 212 to the marketplace server 104, in one approach. Any network 218 may be used, as would be known to one of skill in the art, and the various components of system 200 may be connected wirelessly and/or hard-wired to the network 218, in various examples.

In order to track which eBooks a particular user device has ownership of, a distributed ledger is maintained by each user device in system 200. User device 210 maintains distributed ledger 214, and user device 212 maintains distributed ledger 216. These distributed ledgers include at least a portion, and possibly all, of a global ledger that describes the eBooks and other digital media assets that are available in system 200. In one approach, the distributed ledgers may include entries that are specific to the particular user device on which the distributed ledger is maintained. In a further approach, the distributed ledgers may include entries for other eBooks and/or digital assets that are not specific to the particular user device on which the distributed ledger is maintained, possibly in combination with the entries that are specific to the particular user device. In one implementation, the entries of the various distributed ledgers may be combined together to form the whole global ledger for validation of ownership and other aspects of the various digital media assets within system 200.

The user devices 210, 212 are configured to access and/or play digital media assets, such as displaying eBooks like Amy's Limelight, audibly playing music, and/or visually displaying and audibly playing a movie. In one example, the user devices 210, 212 may also be configured to store eBooks, such as to a computer readable storage medium thereof.

In this example, user device 210 has ownership of three eBooks (eBook 202, eBook 204, and Limelight eBook 206) as indicated by the entries in the distributed ledger 214 managed by user device 210. The ownership of these three eBooks is also synchronized with the marketplace server 104, such as by storing entries for each eBook in the distributed ledger 208 that match entries in the distributed ledger 214. In one approach, the marketplace server 104 may store the eBooks 202, 204, 206 and provide access to the eBooks remotely via a wireless connection, using any technology for distribution thereof, such as streaming or some other known method of providing digital media assets remotely.

In another approach, one or more of the eBooks may be downloaded to user device 210 in response to a purchase order being sent from user device 210 to the marketplace server 104. In this approach, a copy of the eBook(s) do not remain with the marketplace server 104, but instead are downloaded to user device 210 and removed from the marketplace server 104. In this example, one or more of the eBooks 202, 204, 206 may be obtained by purchasing the eBooks(s) through a digital storefront hosted by the marketplace server 104.

The digital storefront hosted by the marketplace server 104 may be a user interface website published online and accessible through a commercially available web browser. The digital storefront may sell and promote eBooks, like Limelight eBook 206, in one example. The digital storefront may sell any type of digital media asset known in the art, such as other digital print assets, digital audio assets, digital images, and digital video assets.

The marketplace server 104 also stores and/or has access to a distributed ledger 208 which includes ownership information for at least some versions of digital media assets managed by the marketplace server 104. This distributed ledger 208 is used to indicate ownership of the various digital assets available through the marketplace server 104, such as prior to being transferred to another device, along with other information that provides security for the digital media assets and ensures that users have access to the digital media assets to which they are entitled to have access.

In a further approach, the distributed ledger 208 includes ownership information for every version of every digital media asset managed by the marketplace server 104. In this approach, the marketplace server 104 may store, in the distributed ledger 208, an entry for eBook 202, an entry for eBook 204, and an entry for Limelight eBook 206, with each entry indicating that user device 210 has ownership of these digital media assets, and therefore user device 210 has unfettered access to these eBooks.

In another approach, a user of user device 210 may be granted ownership over eBooks 202, 204, 206, with the owner being able to view and/or modify the eBooks 202, 204, 206 on any electronic device being used by the user. In yet another approach, a predetermined number of electronic devices may be granted access to the eBooks, with the user submitting or indicating which electronic devices are to be granted access. This information may be stored in association with a user account. In each approach, only one electronic device may be granted access to a particular eBook at any one time, e.g., multiple electronic devices are not authorized to access the particular eBook simultaneously. In an alternate approach, multiple authorized user devices may access the same eBook simultaneously, as desired by the original seller of the eBook.

Figure 2B:
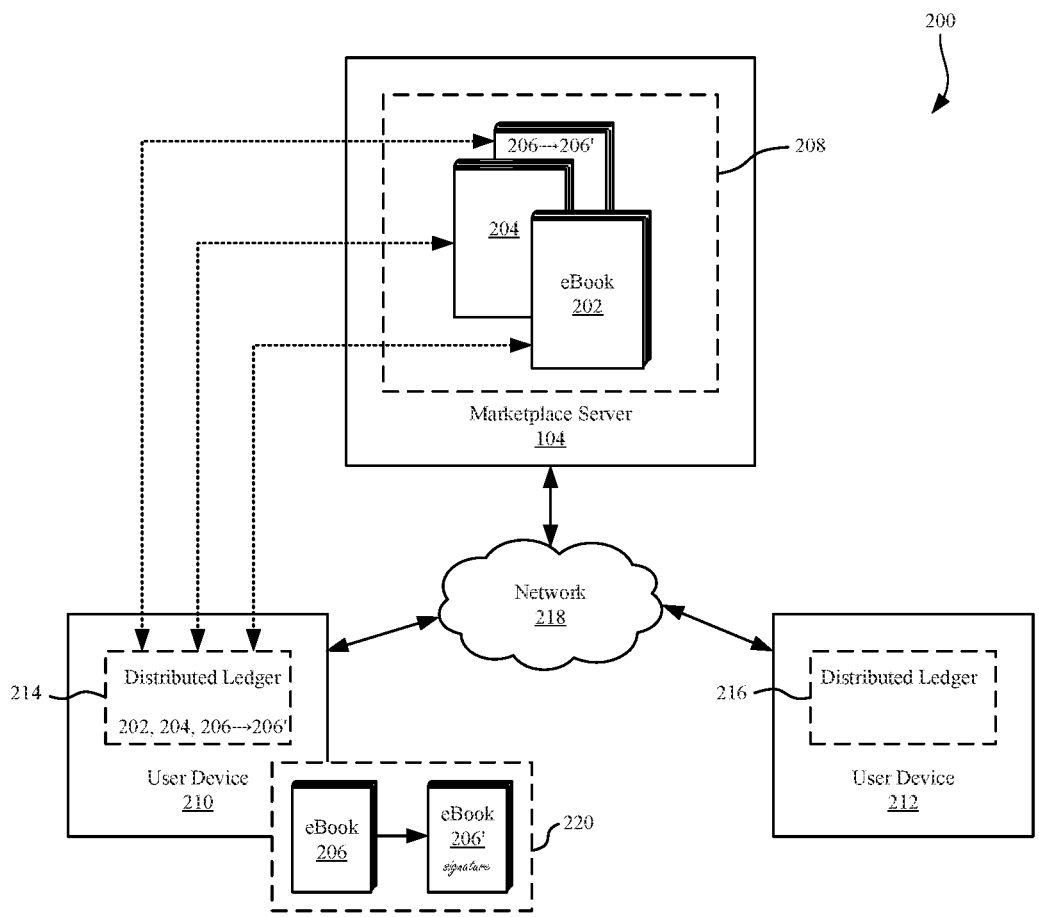

FIG. 2B shows modification of Limelight eBook 206, or some other digital media asset, according to one embodiment. In one example, a user of user device 210, such as Amy the author, generates a customized Limelight eBook 206' by modifying Limelight eBook 206 in a modification operation 220, such as by adding a digital signature to the Limelight eBook 206. The modification operation 220 may comprise adding first digital content to Limelight eBook 206, such as annotations, a signature, a dedication, artwork, explanations for why certain themes/ideas/concepts appear in the eBook, an alternate ending, etc., in several examples. In other examples, the modification operation 220 may comprise changing or removing existing content, such as striking through words, making notes around and/or over words, removing questionable and/or derogatory material, etc.

The modification of Limelight eBook 206 to customized Limelight eBook 206' is reflected in the distributed ledger 214 maintained by user device 210, to allow the customized Limelight eBook 206' to be accessed by user device 210. Moreover, the distributed ledger 208 of the marketplace server 104 may also be updated to reflect the modification of Limelight eBook 206 to customized Limelight eBook 206', while maintaining the ownership information that associates customized Limelight eBook 206' with user device 210 and/or a user account associated with user device 210 (and the user of the device).

Figure 2C:
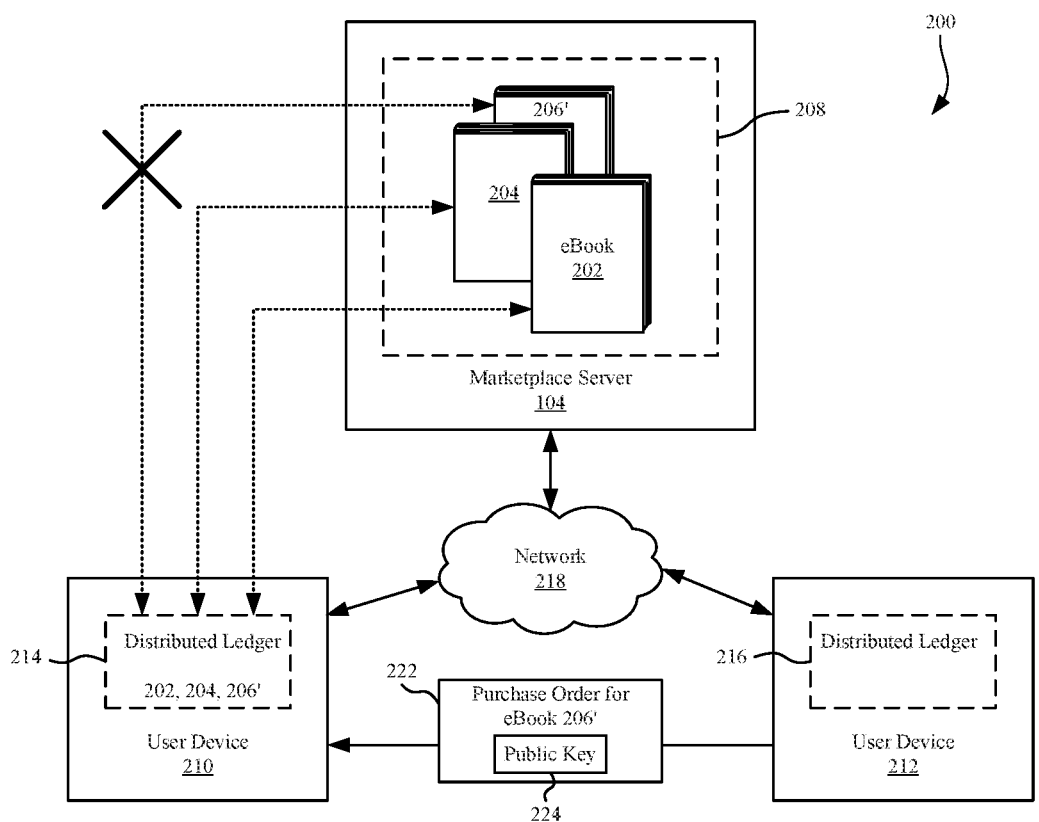

FIG. 2C shows a transfer of customized Limelight eBook 206', or some other digital media asset, according to one embodiment. In an example, the user of user device 212 may really like Amy the author, and may want to own a version of Limelight that bears her signature. In this example, user device 212, possibly at the request of the user, issues a purchase order 222 for the customized Limelight eBook 206'. In one approach, this purchase order 222 may be sent, peer-to-peer, from user device 212 to user device 210. In another approach, this purchase order 222 may be sent through network 218 to reach user device 210. This transfer model is indicative of a direct exchange between the two user devices, and may include customized Limelight eBook 206' being advertised for sale by the marketplace server 104.

In one example, the purchase order 222 may be sent from user device 212 to the marketplace server 104. Once it arrives at the marketplace server 104, the marketplace server 104 may transfer ownership of the customized Limelight eBook 206' from user device 210 to user device 212 in the distributed ledger 208 of the marketplace server 104. This transfer model is indicative of an advertisement model, where the marketplace server 104 advertises that the customized Limelight eBook 206' is available for purchase and receives the purchase order 222. However, user device 210 maintains ownership over the customized Limelight eBook 206' up until the point when ownership is transferred to the user device 212 which issued the purchase order 222.

According to another example, once the purchase order 222 arrives at the marketplace server 104, the purchase order 222 may be sent to user device 210. Then, user device 210 may transfer ownership of the customized Limelight eBook 206' from user device 210 to user device 212 by indicating the new ownership in the distributed ledger 214 resident on user device 210. This is another example of an advertisement model, where user device 210 maintains ownership over the customized Limelight eBook 206' up until the point when ownership is transferred to the user device 212 which issued the purchase order 222.

In yet another example, user device 210 may assign ownership of the customized Limelight eBook 206' to the marketplace server 104 with instructions to offer the customized Limelight eBook 206' for sale, with an agreed upon return being sent back to user device 210 in the event of a sale, indicative of a consignment model. In this example, once the purchase order 222 arrives at the marketplace server 104, the marketplace server 104 may transfer ownership of the customized Limelight eBook 206' from the marketplace server 104 to user device 212 by indicating the new ownership in the distributed ledger 208 of the marketplace server 104.

Of course, many other techniques are possible for receiving a purchase order 222, storing the customized Limelight eBook 206' prior to and/or after the sale, and transferring ownership of the customized and/or after the eBook 206' in response to the purchase order 222, as would be appreciated by one of skill in the art upon reading the present descriptions.

Changes that are made to any of the distributed ledgers 208, 214, 216 of the various devices in system 200 are reflected in the other distributed ledgers, when appropriate to introduce and/or revoke ownership of certain eBooks, and other digital media assets, from particular devices. For example, if a device concedes ownership of an eBook, then the distributed ledger of that device may be updated to reflect the change in ownership. This change may then be propagated to other distributed ledgers which include an entry for the eBook undergoing ownership change, such as the distributed ledger 208 of the marketplace server 104.

In FIG. 2C, the change in ownership of the customized Limelight eBook 206' is signified by the removal of the link from the entry for the customized Limelight eBook 206' in the distributed ledger 214 of user device 210 to the entry for the customized Limelight eBook 206' in the distributed ledger 208 of the marketplace server 104. This removal of the link is in response to sending and receiving the purchase order 222. Ledgers 208 and 214 track ownership of the eBooks, and because the customized Limelight eBook 206' is no longer owned by user device 210 once user device 212 issues the purchase order 222 and it is received by user device 210, the link illustrating ownership of the customized Limelight eBook 206' is removed from user device 210. The new ownership is reflected in FIG. 2D by a new link from user device 212 to the customized Limelight eBook 206'.

Referring again to FIG. 2C, in one approach, the purchase order 222 may include a public key 224, or some other uniquely identifying code, that may be used to identify the customized Limelight eBook 206'. In one example, any of the various distributed ledgers may include public keys in entries related to eBooks that are stored in the distributed ledgers, such that when a purchase order is received and a public key from the purchase order is compared to a public key in a ledger, it is possible to verify whether the two public keys match, indicating which eBook is being purchased.

In this way, user device 210 may verify that user device 212 is authorized to obtain the ownership rights to the customized Limelight eBook 206', as discovered from the purchase order 222, prior to releasing ownership of the customized Limelight eBook 206' based on the public key 224 included in the purchase order 222.

According to one embodiment, the original Limelight eBook 206 may be decrypted by the user device 210 using a first private key. In this embodiment, the first public key 224 is used to encrypt the original Limelight eBook 206.

Furthermore, the first private key is accessible to the user device 210 (such as being generated by the user device 210). The decrypting may be performed prior to generating the customized Limelight eBook 206' to provide the user device 210 with access to the content of the original Limelight eBook 206.

In one approach, the first public key 224 may be stored by the user device 210 to the distributed ledger 214, for use in future transactions and/or customizations of the Limelight eBook 206. In this approach, the distributed ledger 214 is configured to store a public key that identifies each digital media asset owned by a user of the user device 210. In a further approach, private keys for digital media assets owned by the user device 210 may also be stored to the distributed ledger 214 or a digital wallet of user device 210, but not to any other ledgers or devices in system 200, to maintain privacy of the private keys.

Figure 2D:
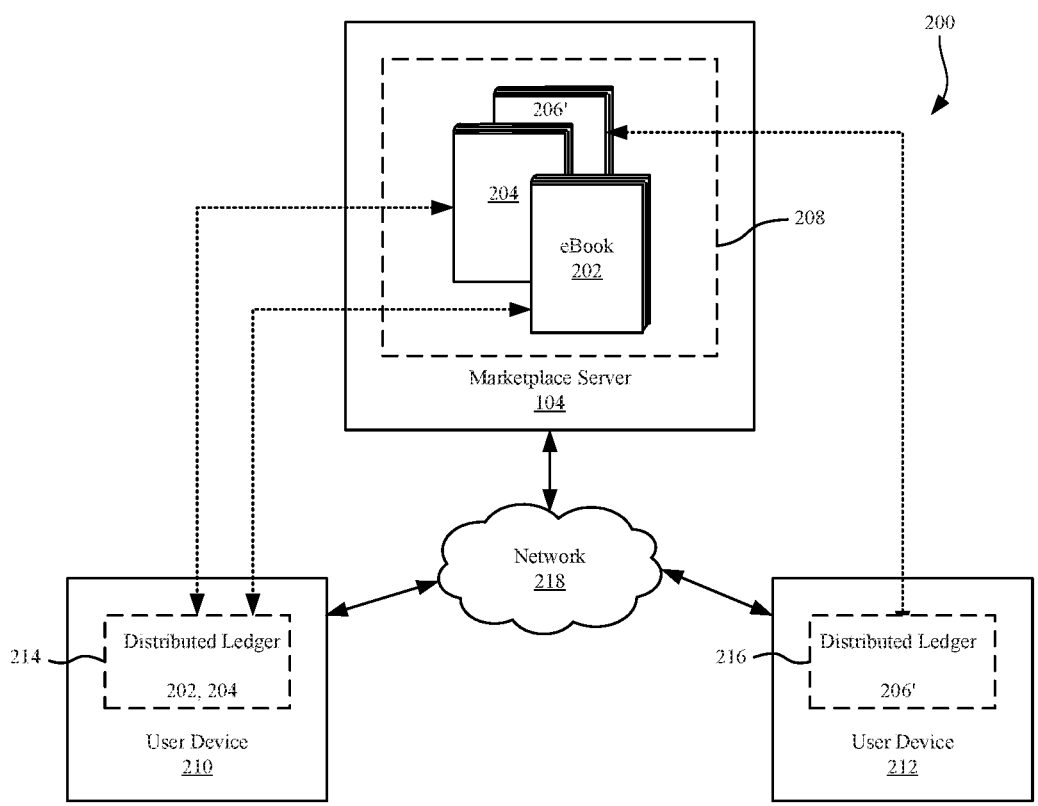

FIG. 2D shows a change in ownership of the customized Limelight eBook 206'. In FIG. 2D, ownership of the customized Limelight eBook 206' changes from user device 210 to user device 212 as reflected in the distributed ledger 208 of the marketplace server 104, the distributed ledger 214 of user device 210, and the distributed ledger 214 of user device 210. This change in ownership is a result of the purchase order shown in FIG. 2C. Referring again to FIG. 2D, should any other device wish to access and/or purchase the customized Limelight eBook 206' bearing Amy's signature, the device would need to communicate with the marketplace server 104 and/or user device 212, to determine ownership of the customized Limelight eBook 206'. Only then would such a device be able to negotiate a purchase arrangement to acquire and/or access the customized Limelight eBook 206'.

In an approach, the customized Limelight eBook 206' may be encrypted or otherwise made secure by the user device 210, such as by using a second public key, prior to publishing the customized Limelight eBook 206' to the marketplace server 104.

Figure 3:
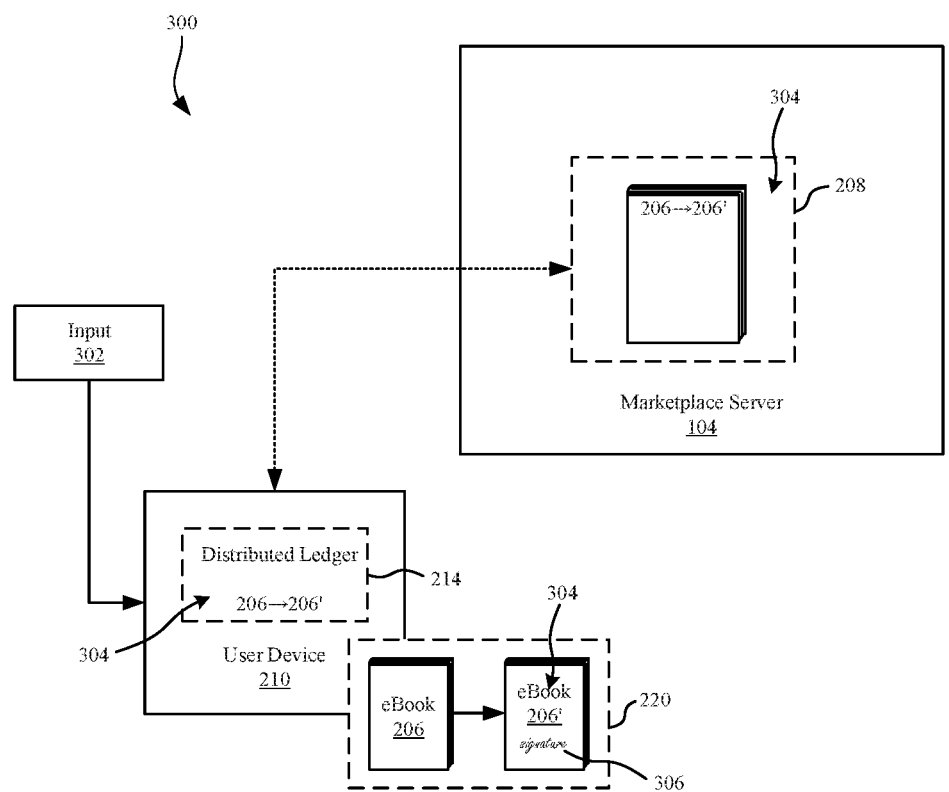
FIG. 3 shows an example system for modifying a digital print asset.

FIG. 3 shows an example system 300 for modifying a digital media asset. For this example, the digital media asset that is modified is the Limelight eBook 206, but any digital media asset may be modified in various approaches according to the operations described in FIG. 3.

The original Limelight eBook 206 is modified by user device 210 in the modification operation 220 in response to input 302 received at user device 210. This input 302 may be provided by a user such as Amy, received by the user device 210 from another device, or obtained in some other way by user device 210. The input 302 may include Amy's signature 306, or some other text, graphics, image(s), video(s), music, audio, or other form or type of media content known in the art.

The second digital content may include any type of content known in the art, such as: a signature of a person like Amy's signature 306, annotations related to the first digital content, artwork related to the first digital content, artwork related to the second digital content, digital musical content, album art for a musical composition, drawings related to the first digital content, sketches related to the first digital content, doodles related to the first digital content, audio commentary related to the first digital content, etc.

In one approach, the input 302 includes second digital content to be added to the Limelight eBook 206. In response to receiving the input 302, the user device 210 generates a customized Limelight eBook 206'. The customized Limelight eBook 206' includes third digital content, which is based on the original content of the Limelight eBook 206 and the second digital content, such as Amy's signature 306, included in the input 302. Once the customized Limelight eBook 206' is generated, it replaces the original Limelight eBook 206. The first content of the original Limelight eBook 206 is no longer available for reading, either from the user device 210 or via the marketplace server 104.

According to one embodiment, a method is provided to indicate a first time that the customized Limelight eBook 206' is opened and/or read. This method may be used to ensure that a purchaser of an asset knows that he or she is the first to experience the asset in its unique form, e.g., to indicate that the customized Limelight eBook 206' has not been opened, music has not been played, an image has not been viewed, etc. To provide this unopened indication, the third digital content that is added to the customized Limelight eBook 206' may include a marker 304. The marker 304 indicates a first time that the third digital content of the customized digital print asset is accessed by a user, for example, a first time that the customized Limelight eBook 206' is opened by a user to be read.

In other approaches, the distributed ledger 214 of user device 210 and/or the distributed ledger 208 of the marketplace server 104 may include the marker 304 that signifies a first time that the third digital content of the customized digital print asset is accessed by a user.

In one embodiment, the marker may be a bit that is flipped from 0 to 1, or from 1 to 0, in response to the content of the digital media asset being viewed for a first time by any user. This bit may not ever be flipped back for this particular digital media asset, in order to preserve the information that this bit represents.

In another example, the marker may be a string or alphanumeric code. The marker may also include a timestamp that indicates when the asset was first opened or accessed.

In one approach, to ensure that the content of the original Limelight eBook 206 is no longer available for consumption, a distributed ledger 214 of the user device 210 and the distributed ledger 208 of the marketplace server 104 are modified to include: a) a hash of the third digital content added to the customized Limelight eBook 206', and b) an association between the original Limelight eBook 206 and the customized Limelight eBook 206'. Any of the distributed ledgers 208, 214, may include additional information about the original Limelight eBook 206 and/or the customized Limelight eBook 206', such as a marker signifying a first time that the third digital content of the asset is accessed by a user, a marker that signifies that the original Limelight eBook 206 has been modified to generate the customized Limelight eBook 206', a name of the asset, a size of the asset, a time/date stamp related to creation or modification of the asset, one or more keys used in encryption/decryption of the asset, etc.

Once, the customized Limelight eBook 206' is generated, the customized Limelight eBook 206' may be published by the user device 210 to the marketplace server 104 for distribution. This may be accomplished by transferring the customized Limelight eBook 206' to the marketplace server 104 such that the marketplace server 104 takes control of the only instance of the customized Limelight eBook 206'. In another approach, where the original Limelight eBook 206 is maintained on the marketplace server 104, the modifications to the Limelight eBook 206 are made on the marketplace server 104 to generate the customized Limelight eBook 206', which is then published for distribution on the marketplace server 104.

In an approach, blockchain may be used to secure the content of any digital asset described in FIGS. 2A-2D and 3. In this approach, a first block entry related to the customized Limelight eBook 206' may be generated, by the user device 210, for use in a blockchain that tracks the history of the original Limelight eBook 206, changes to the Limelight eBook 206, owners of the Limelight eBook 206, owners of the customized Limelight eBook 206', and/or any other useful information that may enable value and uniqueness of eBooks to be produced. Once the first block entry related to the customized Limelight eBook 206' is generated, it may be added, by the user device 210, to a blockchain related to the original Limelight eBook 206.

In a further approach, the blockchain may be stored to the distributed ledger 214 on the user device 210 and/or to the distributed ledger 208 on the marketplace server 104 for use in future transactions and/or modifications to the underlying asset.

FIG. 4 shows an example ledger 400. Ledger 400 includes a plurality of entries 402, each entry 402 being related to one digital media asset. An entry 402 may include information related to the digital media asset that allows a device which manages ledger 400 to access the digital media asset. Entry 404 is related to an original Limelight eBook, and entry 406 is related to a customized Limelight eBook, as an example. Information that may be included in the entries 404 includes, but is not limited to, a title or name of the digital media asset, an author or creator's name, a unique identifier of the digital media asset (such as a string or alphanumeric code), a timestamp (e.g., to denote an event in the life of the asset, such as a creation date, a last modified date, a transaction date, etc.), a public key associated with the asset for encrypting the asset, an indication of whether the asset has been modified, a marker indicating whether the asset has been opened or not, a hash of at least some content of the asset, etc.

In example entry 404, the name is indicated as "Limelight," the author is indicated as Amy, the unique identifier is AA00ZZ99, the timestamp indicates that the eBook was acquired on Jan. 1, 2019, the modified indicator is marked as "No" denoting that the original content of the eBook has not been modified, and the opened marker reports "Yes" indicating that the eBook has been opened by a user.

In example entry 406, the name is indicated as "Limelight (Signed by Amy)," the author is indicated as Amy, the unique identifier is BA00ZZ99, the timestamp indicates that the eBook was modified on Apr. 1, 2019, the modified indicator is marked as "Yes" denoting that the original content of the eBook has been modified (in this example, the eBook has bene digitally signed by Amy), and the opened marker reports "No" indicating that the eBook has not been opened by a user.

Any other useful information may be included in an entry 402 of ledger 400 to secure the provenance of the digital media asset being described by the entry 402, including a hash of modified content, a collection of change events that affect the digital media asset in its lifetime (possibly with timestamps for each event), metadata that identifies changes over time, a list of previous owners (should such owners allow their ownership to be made public), etc.

In one approach, ledger 400 may include an entry that describes changes that have been made to an original digital media asset from its creation. Some or all of the following information may be included to describe these changes: a hash of each change, a hash of all changes together, a timestamp indicating a date and time of each change, an owner who implemented the change, timestamps for each ownership transaction, a price paid for the asset at each transaction, etc.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 5:
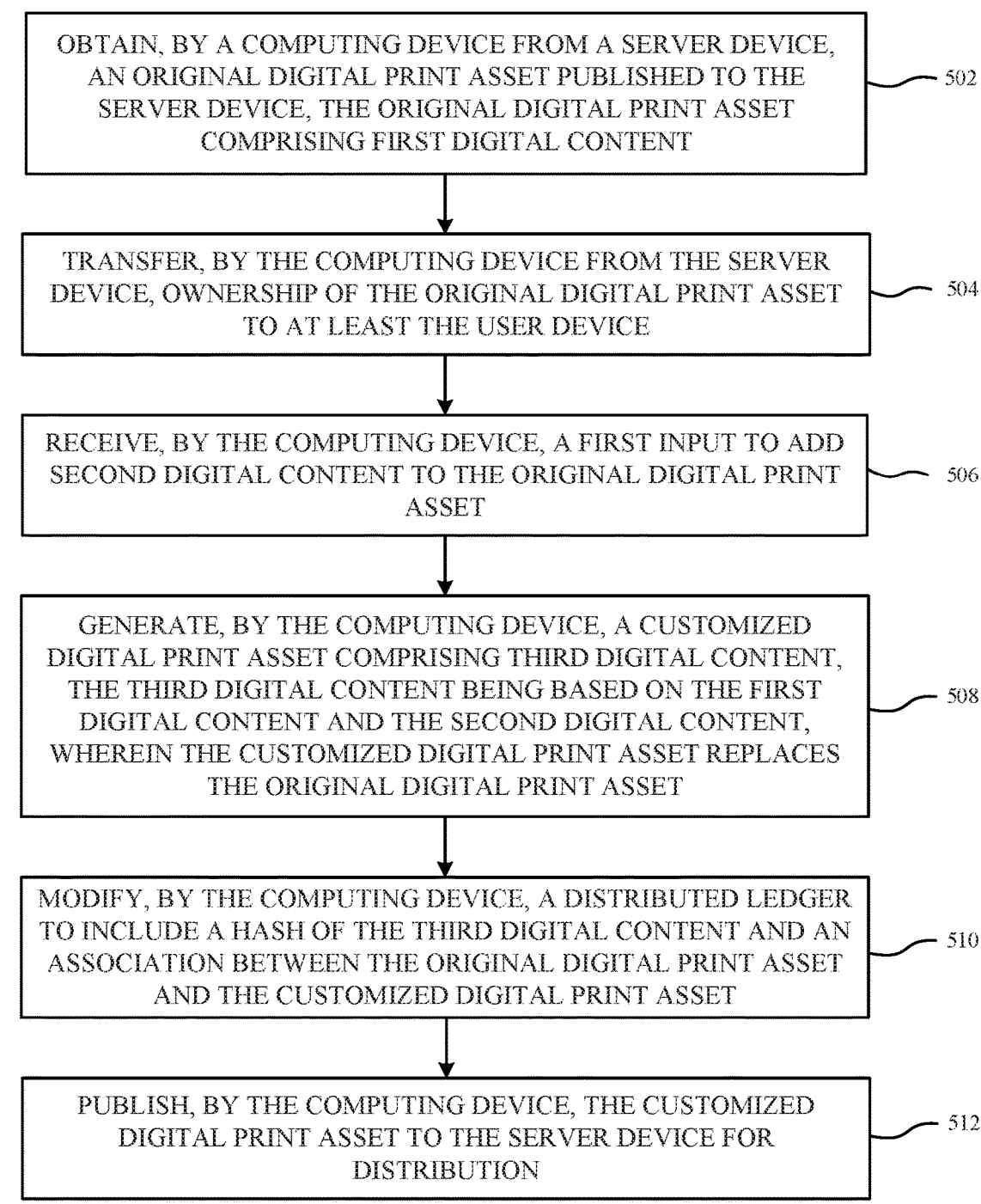
FIG. 5 is flow diagram of an example process for generating and managing unique digital media assets.

FIG. 5 is flow diagram of an example process 500 for generating and managing unique digital media assets. In operation 502, an original digital print asset published to a server device is obtained by a computing device from the server device. The original digital print asset includes first digital content.

The first digital content includes digitally stored two-dimensional image and/or text data that is used to render the digital print asset by an application configured to read, play, or otherwise produce digital print assets.

The original digital print asset may include any type of digital print asset known in the art, such as an eBook, a digital version of a magazine, a newspaper, a comic book, an educational material like a school book or handout, an instructional guide, an assembly or operational manual, etc.

In one approach, multiple versions of the original digital print asset may be available from the server device (all identical). In a further approach, the original digital print asset may be available on the server device along with other digital media assets, such as commercially available eBooks, digital music, digital videos, etc.

The computing device may be any type of computing device known in the art, such as a desktop computer, a media device like a STB, a digital streaming device, an e-reader, a smart TV, etc. The computing device is configured to upload data to and download data from the server device, in one approach.

The server device may be any device having a processor that is configured to publish digital media assets, like the marketplace server described in FIGS. 2A-2D, among other possible devices. The server device may host a cloud storage environment where a plurality of digital media assets are stored and available for download, once certain conditions are met by a requesting device (such as payment of a purchase price, submission of proper identification information, etc.).

The original digital print asset may be obtained from the server device by purchasing the original digital print asset through a first digital storefront hosted by the server device. This purchase may be executed by the computing device by transmitting a purchase order for the original digital print asset to the server device, and receiving a message from the server device that includes information that allows for acquisition of the original digital print asset by the computing device.

In a further approach, the first digital storefront may be located remotely from the computing device, and the first digital storefront is accessed via a wireless interface of the computing device.

Referring again to FIG. 5, in operation 504, ownership of the original digital print asset is transferred from the server device to the computing device. This transfer may be performed by the computing device pulling the ownership from the server device in an approach, or by the server device pushing the ownership to the computing device in another approach.

Ownership of the digital media asset provides unfettered access to the digital print asset and confers authorization to modify content of the digital print asset, by adding content, removing content, etc.

In operation 506, a first input is received by the computing device to add second digital content to the original digital print asset. The first input may be provided by a user of the computing device manually for this particular digital media asset, in one approach. In other approaches, the first input may be automatically generated based on previously submitted information (like a signature image that is appended to a plurality of digital print assets in an automated process).

The second digital content may include any type of data applicable to the first digital content of the original digital print asset as would be known to one of skill in the art. Several non-limiting examples include annotations for text-based data (thoughts describing panes of a comic book, reasoning or analysis providing insight into passages of a school textbook, explanations for why certain themes/ideas/concepts appear in the original digital print asset, etc.), words explaining or describing artwork or a photographic image (an artist may provide insights into motivations for artwork or the photographic image, what the artwork or photographic image means to the artist, how the artist wants a viewer to feel when beholding the artwork or photographic image, etc.); a signature (e.g., hand-drawn by an author, editor, publisher, or other person related to the original digital print asset); artwork related to or inspired by the original digital print asset; an image related to or inspired by the original digital print asset; and alternate material or content for inclusion in and replacing original content in the original digital print asset (an alternate ending, reworking a section of a novel, re-explaining a concept from an instructional manual more clearly, etc.).

In other examples, the second digital content may change or replace existing content, such as striking through words, making notes around and/or over words, removing questionable and/or derogatory material, etc.

The computing device generates a customized digital print asset comprising third digital content in operation 508. The third digital content is based on the first digital content and the second digital content. In one approach, the second digital content is added to the second digital content to form the third digital content. In another approach, a portion of the first digital content is replaced by the second digital content to form the third digital content. In yet another approach, a portion of the first digital content is deleted, and the second digital content is added to the remaining portion of the first digital content to form the third digital content.

In one approach, the third digital content of the customized digital print asset may include an indicator that signifies a first time when the third digital content of the customized digital print asset is accessed by a user. This indicator is useful for determining whether an eBook has been "cracked," opened, and/or accessed, or whether it is still unopened and un-accessed by a user, which may impart additional value and/or rarity to the digital asset.

Moreover, the customized digital print asset replaces the original digital print asset wherever it may be stored (e.g., on the computing device, on the server device, or on another storage accessible by the computing device).

As shown in operation 510, a distributed ledger is modified by the computing device to include a hash of the third digital content and an association between the original digital print asset and the customized digital print asset. This modification of the distributed ledger creates the relationship between the original and customized digital print assets.

Then, in operation 512, the customized digital print asset is published by the computing device to the server device for distribution. The publication may comprise transmitting the customized digital print asset to the server device. Further, additional identifying and/or useful information may be sent, together or in a separate transmission from the customized digital print asset, to the server device to provide context for the changes, security for encrypting and/or accessing the customized digital print asset, etc.

In one approach, the distributed ledger may be modified to include the first indicator signifying a first time that the third digital content of the customized digital print asset is accessed by a user.

In an approach, the original digital print asset may be decrypted by the computing device using a first private key (accessible to the computing device). The decrypting is performed prior to generating the customized digital print asset so that the first digital content is accessible to the computing device for modification thereof.

Moreover, the first public key may be stored by the computing device to the distributed ledger, for use in future transactions and/or identification of the computing device and/or digital asset. In this approach, the distributed ledger is configured to store, for each digital print asset accessible by the computing device, an associated public key. A digital wallet and/or the local distributed ledger on the computing device may store a private key for digital print assets accessible to the computing device in more examples.

Moreover, the computing device may encrypt or otherwise secure the customized digital print asset using a second public key prior to publishing the customized digital print asset to the server device.

In an approach, blockchain may be used to secure the content of any digital asset described in FIG. 5. In this approach, a first block entry related to the customized digital print asset may be generated, by the computing device, for use in a blockchain that tracks the history of the original digital print asset, changes to the original digital print asset, owners of the original digital print asset, owners of the customized digital print asset, and any other useful information that may enhance and/or provide security to users of and the content of the digital print assets, and provide value and/or uniqueness to the customized digital print asset. Once the first block entry related to the customized digital print asset is generated, it may be added, by the computing device, to a blockchain related to the original digital print asset. The blockchain may be obtained from the server device, in an approach, or acquired by some other method or from another source.

In a further approach, the blockchain may be stored to the distributed ledger on the computing device and/or to the distributed ledger on the server device for use in future transactions and/or modifications to the underlying digital print asset.

Figure 6:
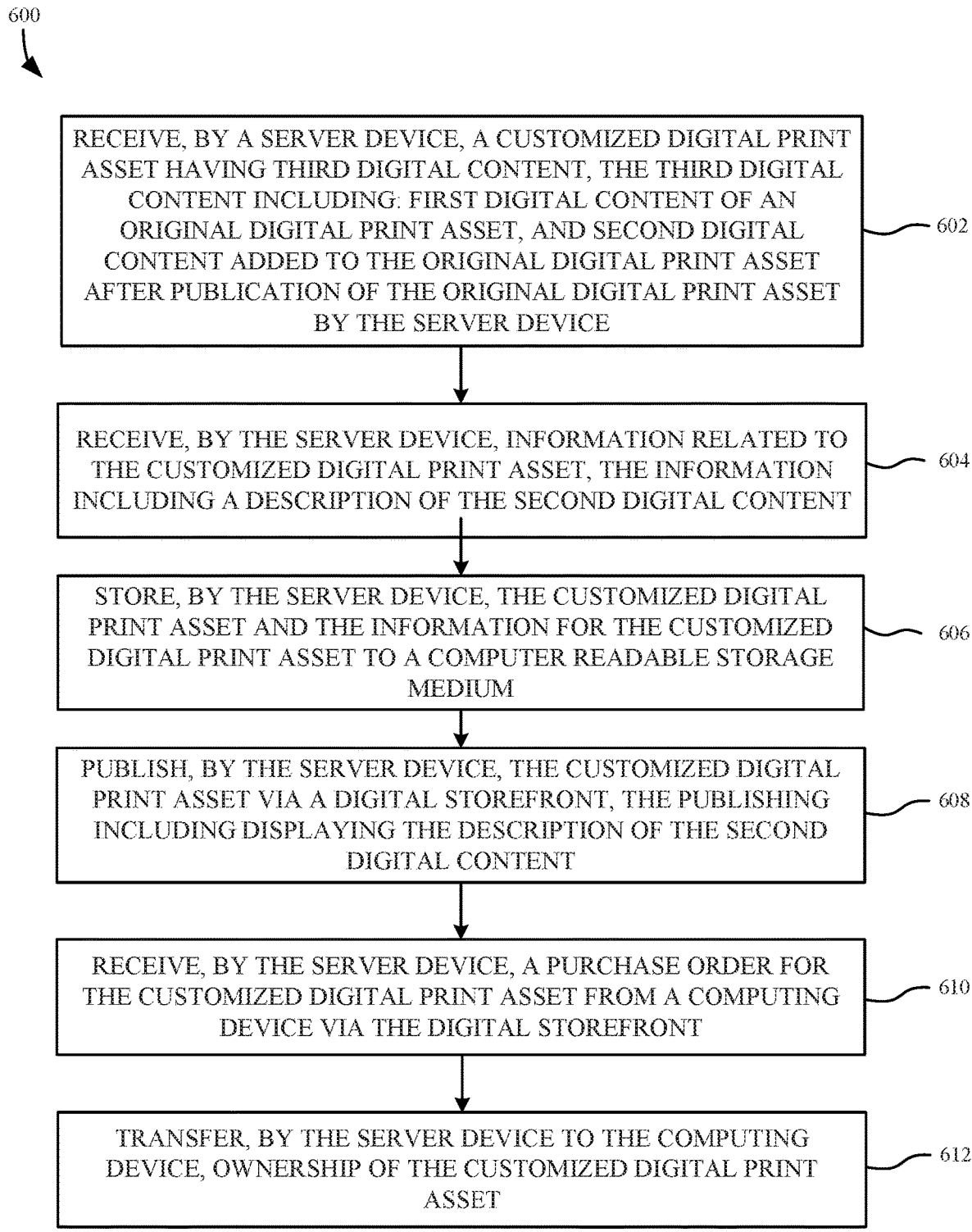
FIG. 6 is flow diagram of another example process for generating and managing unique digital media assets.

FIG. 6 is flow diagram of an example process 600 for generating and managing unique digital media assets. In operation 602, a customized digital print asset comprising third digital content is received by a server device. The third digital content includes first digital content of an original digital print asset and second digital content added to the original digital print asset after publication of the original digital print asset by the server device.

In one approach, the customized digital print asset is received from a computing device capable of viewing and modifying such digital print assets.

The customized digital print asset may include any type of digital print asset known in the art, such as an eBook, a digital version of a magazine, a newspaper, a comic book, an educational material like a school book or handout, an instructional guide, an assembly or operational manual, etc.

In one approach, multiple versions of the original digital print asset may be available from the server device (all identical with no limit on the number that may be purchased), but only one copy (or a limited pre-specified number of copies, e.g., in a numbered series, as a limited release, etc.) of the customized digital print asset are available. In a further approach, the original digital print asset may be available on the server device along with other digital media assets, such as commercially available eBooks, digital music, digital videos, etc.

The third digital content includes digitally-stored two-dimensional image and/or text data that is used to render the customized digital print asset by an application configured to read, play, or otherwise produce digital print assets.

Also, the third digital content is based on the first digital content and the second digital content. In one approach, the second digital content may have been added to the second digital content to form the third digital content. In another approach, a portion of the first digital content may have been replaced by the second digital content to form the third digital content. In yet another approach, a portion of the first digital content may have been deleted, and the second digital content may have been added to the remaining portion of the first digital content to form the third digital content. Any of these operations may have been performed by the computing device, or by the server device, in various approaches.

In one approach, the third digital content of the customized digital print asset may include an indicator that signifies a first time when the third digital content of the customized digital print asset is accessed by a user. This indicator is useful for determining whether an eBook has been "cracked," opened, and/or accessed, or whether it is still unopened and un-accessed by a user, which may impart additional value and/or rarity to the digital asset.

In one approach, the customized digital print asset may replace an original digital print asset on which the customized digital print asset is based and that was owned by the computing device which transferred the customized digital print asset to the server device.

The second digital content may include any type of data applicable to the first digital content of the original digital print asset as would be known to one of skill in the art. Several non-limiting examples include annotations for text-based data (thoughts describing panes of a comic book, reasoning or analysis providing insight into passages of a school textbook, explanations for why certain themes/ideas/concepts appear in the original digital print asset, etc.), words explaining or describing artwork or a photographic image (an artist may provide insights into motivations for artwork or the photographic image, what the artwork or photographic image means to the artist, how the artist wants a viewer to feel when beholding the artwork or photographic image, etc.); a signature (e.g., hand-drawn by an author, editor, publisher, or other person related to the original digital print asset); artwork related to or inspired by the original digital print asset; an image related to or inspired by the original digital print asset; and alternate material or content for inclusion in and replacing original content in the original digital print asset (an alternate ending, reworking a section of a novel, re-explaining a concept from an instructional manual more clearly, etc.).

In other examples, the second digital content may change or replace portions of the existing first digital content, such as striking through words, making notes around and/or over words, removing questionable and/or derogatory material, etc.

The server device may be any device having a processor that is configured to publish digital media assets, like the marketplace server described in FIGS. 2A-2D, among other possible devices. The server device may host a cloud storage environment where a plurality of digital media assets are stored and available for download, once certain conditions are met by a requesting device (such as payment of a purchase price, submission of proper identification information, etc.).

The customized digital print asset may be sent by a computing device to the server device for publication thereof, on behalf of the computing device. The computing device may be any type of computing device known in the art, such as a desktop computer, a media device like a STB, a digital streaming device, an e-reader, a smart TVs, etc. The computing device is configured to upload data to and download data from the server device, in one approach.

The original digital print asset may have been obtained from the server device originally by the computing device (or through some other device that publishes such digital print assets) by purchasing the original digital print asset through a first digital storefront hosted by the server device. This purchase may be processed by receiving a purchase order for the original digital print asset from the computing device, and sending a message to the computing device that includes information that allows for acquisition of the original digital print asset by the computing device. In a further approach, the server device may transmit the original digital print asset to the computing device.

In a further approach, the first digital storefront may be located remotely from the computing device, and the first digital storefront is accessed via a wireless interface of the computing device.

Referring again to FIG. 6, in operation 604, information related to the customized digital print asset is received by the server device. The information includes at least a description of the second digital content. The information may include additional data related to the customized digital print asset, such as a number of copies of the customized digital print asset authorized to be distributed by the server device, pricing related to the customized digital print asset for distribution by the server device, a timeframe for which the customized digital print asset is authorized to be distributed before the ownership reverts to the computing device, a creator of the second digital content, a relationship between the creator of the second digital content and the author of the first digital content, etc.

In operation 606, the customized digital print asset and the information for the customized digital print asset are stored, by the server device, to a computer readable storage medium. The storage medium is accessible by at least the server device, and may be accessible by one or more additional devices, such as the computing device in one example.

As shown in operation 608, the customized digital print asset is published by the server device via a digital storefront for distribution. The publication may comprise displaying the description of the second digital content, so that users are able to understand what modifications have been made to the original digital print asset in creating the customized digital print asset.

In operation 610, a purchase order for the customized digital print asset is received, by the server device, from a second computing device via the digital storefront. The purchase order may be sent directly from the second computing device to the server device, or through one or more intermediate devices, such as a network, marketplace server, etc.

Further, additional identifying and/or useful information may be received, together or in a separate transmission from the purchase order, by the server device to provide context for the asset to be purchased, security for encrypting and/or accessing the customized digital print asset, etc.

As shown in operation 612, ownership of the original digital print asset is transferred from the server device to the computing device. This transfer may be performed by the computing device pulling the ownership from the server device in an approach, or by the server device pushing the ownership to the computing device in another approach.

Ownership of the digital media asset provides unfettered access to the digital print asset and confers authorization to modify content of the digital print asset, by adding content, removing content, etc.

In an example, transferring ownership of the customized digital print asset may include transferring the customized digital print asset to the computing device. In this example, method 600 may also include receiving, by the server device, a first public key for the customized digital print asset in the purchase order and encrypting, by the server device, the customized digital print asset using the first public key prior to transferring the customized digital print asset to the computing device.

Additionally, a distributed ledger may be modified by the server device to include a hash of the third digital content and an association between the original digital print asset and the customized digital print asset. This modification of the distributed ledger creates the relationship between the original and customized digital print assets. The association may be recorded as an identifier of the original digital print asset along with an identifier of the customized digital print asset, and in some approaches may include more information for establishing the relationship, such as time/date stamp, name, owner, etc.

Moreover, the first public key may be stored by the server device to a distributed ledger, for use in future transactions and/or identification of the computing device and/or digital asset. In this approach, the distributed ledger may be configured to store, for each digital print asset accessible and/or managed by the server device, an associated public key.

In addition, the server device may encrypt or otherwise secure the customized digital print asset using a second public key prior to publishing the customized digital print asset for distribution via the digital marketplace.

In one approach, the distributed ledger may be modified to include the first indicator signifying a first time that the third digital content of the customized digital print asset is accessed by a user.

In an approach, the customized digital print asset may be decrypted by the server device using a first private key (accessible to the server device). The decrypting is performed prior to publishing the customized digital print asset and transferring ownership thereof in response to a purchase order.

In an approach, blockchain may be used to secure the content of any digital asset described in FIG. 6. In this approach, a first block entry related to the customized digital print asset may be generated, by the server device, for use in a blockchain that tracks the history of the original digital print asset, changes to the original digital print asset, owners of the original digital print asset, owners of the customized digital print asset, and any other useful information that may enhance and/or provide security to users of and the content of the digital print assets, and provide value and/or uniqueness to the customized digital print asset. Once the first block entry related to the customized digital print asset is generated, it may be added, by the server device, to a blockchain related to the original digital print asset. The blockchain may be obtained from the computing device when receiving the customized digital print asset, in an approach, or acquired by some other method or from another source, such as being stored in the distributed ledger of the server device prior to transferring ownership of the original digital print asset to the computing device.

In a further approach, the blockchain may be stored to the distributed ledger on the computing device and/or to the distributed ledger on the server device for use in future transactions and/or modifications to the underlying digital print asset.

Graphical User Interfaces

This disclosure above describes various Graphical User Interfaces (GUIs) for implementing various features, processes or workflows. These GUIs may be presented on a variety of electronic devices including but not limited to laptop computers, desktop computers, computer terminals, television systems, tablet computers, eBook readers, and smart phones. One or more of these electronic devices may include a touch-sensitive surface. The touch-sensitive surface may process multiple simultaneous points of input, including processing data related to the pressure, degree or position of each point of input. Such processing may facilitate gestures with multiple fingers, including pinching and swiping.

When the disclosure refers to "select" or "selecting" user interface elements in a GUI, these terms are understood to include clicking, lingering, and/or hovering with a mouse, trackpad, touchscreen, or other input device over a user interface element, or touching, tapping or gesturing with one or more fingers or stylus on a user interface element. User interface elements may be virtual buttons, menus, selectors, switches, sliders, scrubbers, knobs, toggles, thumbnails, links, icons, radio buttons, checkboxes and any other mechanism for receiving input from, or providing feedback to a user.

Privacy

As described above, one aspect of the present technology is the gathering and use of data available from various sources to provide enhanced management features for digital media assets. The present disclosure contemplates that in some instances, this gathered data may include personal information data that uniquely identifies or may be used to contact or locate a specific person. Such personal information data may include demographic data, location-based data, telephone numbers, email addresses, social media identifiers, home addresses, data or records relating to a user's health or level of fitness (e.g., vital signs measurements, medication information, exercise information), date of birth, or any other identifying or personal information.

The present disclosure recognizes that the use of such personal information data, in the present technology, may be used to the benefit of users. For example, the personal information data may be used to determine how a user wants media content to be delivered, and a personal setting for providing enhanced management features for digital media assets. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities may subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements may be provided to prevent or block access to such personal information data. For example, for media content advertising purposes, the present technology may be configured to allow users to select to "opt in" or "opt out" of participation in the collection of personal information data during registration for services or anytime thereafter. In another example, users may select not to provide mood-associated data for targeted content delivery services. In yet another example, users may select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the app.

Moreover, it is the intent of the present disclosure that personal information data should be managed and handled in a way to minimize risks of unintentional or unauthorized access or use. Risk may be minimized by limiting the collection of data and deleting data once it is no longer needed. In addition, and when applicable, including in certain health related applications, data de-identification may be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments may also be implemented without the need for accessing such personal information data. That is, the various embodiments of the present technology are not rendered inoperable due to the lack of all or a portion of such personal information data. For example, content may be selected and delivered to users by inferring preferences based on non-personal information data or a bare minimum amount of personal information, such as the content being requested by the device associated with a user, other non-personal information available to the media content advertising services, or publicly available information.

Example System Architecture

Figure 7:
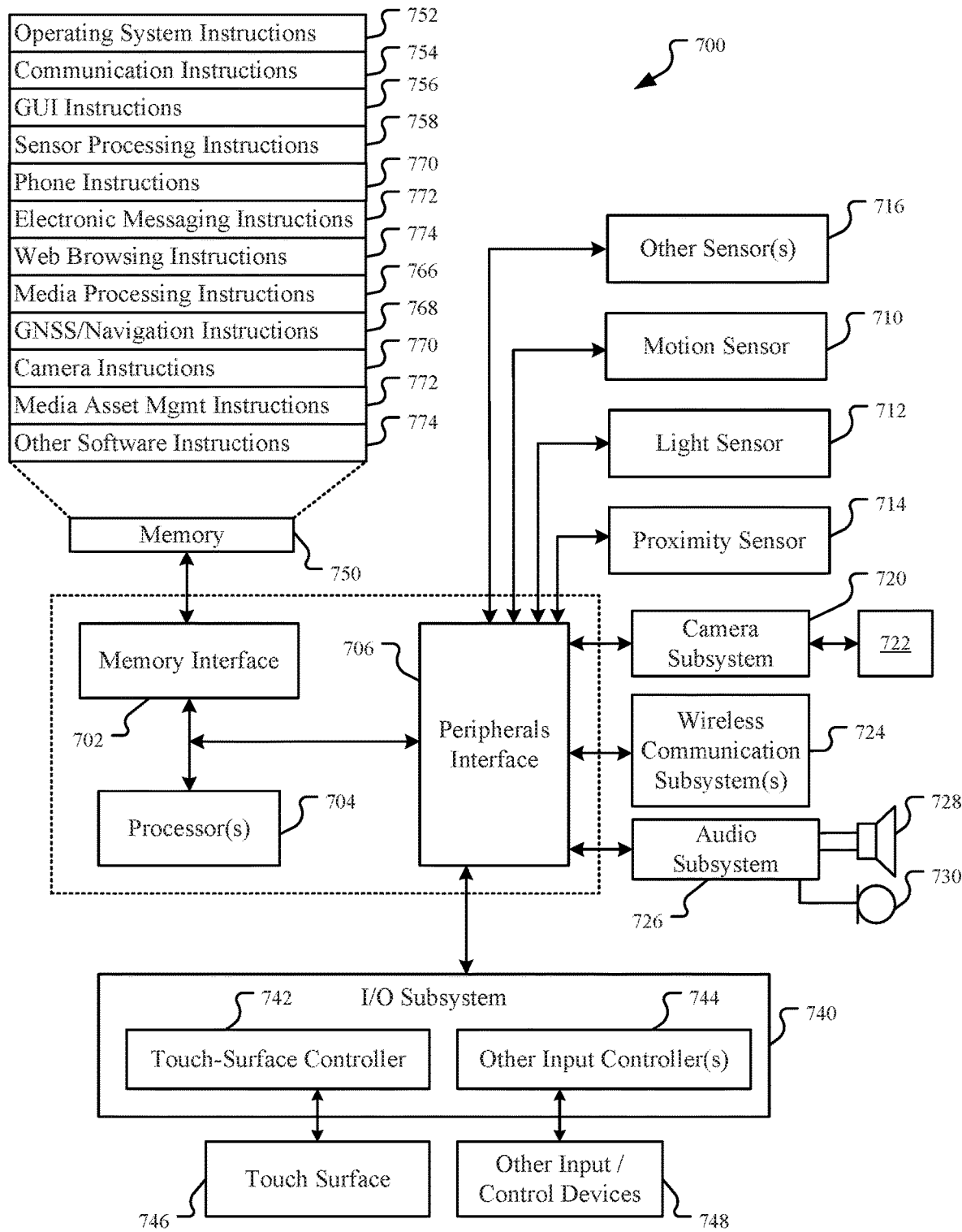
FIG. 7 is a block diagram of an example computing device that may implement the features and processes of FIGS. 1-6.

FIG. 7 is a block diagram of an example computing device 700 that may implement the features and processes of FIGS. 1-6. Referring again to FIG. 7, the computing device 700 may include a memory interface 702, one or more data processors, image processors and/or central processing units 704, and a peripherals interface 706. The memory interface 702, the one or more processors 704 and/or the peripherals interface 706 may be separate components or may be integrated in one or more integrated circuits. The various components in the computing device 700 may be coupled by one or more communication buses or signal lines.

Sensors, devices, and subsystems may be coupled to the peripherals interface 706 to facilitate multiple functionalities. For example, a motion sensor 710, a light sensor 712, and a proximity sensor 714 may be coupled to the peripherals interface 706 to facilitate orientation, lighting, and proximity functions. Other sensors 716 may also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metaloxide semiconductor (CMOS) optical sensor, may be utilized to facilitate camera functions, such as recording photographs and video clips. The camera subsystem 720 and the optical sensor 722 may be used to collect images of a user to be used during authentication of a user, e.g., by performing facial recognition analysis.

Communication functions may be facilitated through one or more wireless communication subsystems 724, which may include radio frequency receivers and transmitters and/or optical (e.g., infrared) receivers and transmitters. The specific design and implementation of the communication subsystem 724 may depend on the communication network(s) over which the computing device 700 is intended to operate. For example, the computing device 700 may include communication subsystems 724 designed to operate over a GSM network, a GPRS network, an EDGE network, a Wi-Fi or WiMax network, and a Bluetooth™ network. In particular, the wireless communication subsystems 724 may include hosting protocols such that the device 100 may be configured as a base station for other wireless devices.

An audio subsystem 726 may be coupled to a speaker 728 and a microphone 730 to facilitate voice-enabled functions, such as speaker recognition, voice replication, digital recording, and telephony functions. The audio subsystem 726 may be configured to facilitate processing voice commands, voiceprinting and voice authentication, for example.

The I/O subsystem 740 may include a touch-surface controller 742 and/or other input controller(s) 744. The touch-surface controller 742 may be coupled to a touch surface 746. The touch surface 746 and touch-surface controller 742 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 may be coupled to other input/control devices 748, such as one or more buttons, rocker switches, thumb-wheel, infrared port, USB port, and/or a pointer device such as a stylus. The one or more buttons (not shown) may include an up/down button for volume control of the speaker 728 and/or the microphone 730.

In one implementation, a pressing of the button for a first duration may disengage a lock of the touch surface 746; and a pressing of the button for a second duration that is longer than the first duration may turn power to the computing device 700 on or off. Pressing the button for a third duration may activate a voice control, or voice command, module that enables the user to speak commands into the microphone 730 to cause the device to execute the spoken command. The user may customize a functionality of one or more of the buttons. The touch surface 746 may, for example, also be used to implement virtual or soft buttons and/or a keyboard.

In some implementations, the computing device 700 may present recorded audio and/or video files, such as MP3, AAC, and MPEG files. In some implementations, the computing device 700 may include the functionality of an MP3 player, such as an iPod™.

The memory interface 702 may be coupled to memory 750. The memory 750 may include high-speed random-access memory and/or non-volatile memory, such as one or more magnetic disk storage devices, one or more optical storage devices, and/or flash memory (e.g., NAND, NOR). The memory 750 may store an operating system 752, such as Darwin, RTXC, LINUX, UNIX, OS X, WINDOWS, or an embedded operating system such as VxWorks.

The operating system 752 may include instructions for handling basic system services and for performing hardware dependent tasks. In some implementations, the operating system 752 may be a kernel (e.g., UNIX kernel). In some implementations, the operating system 752 may include instructions for performing voice authentication. For example, operating system 752 may implement the enhanced management features for digital media assets, as described with reference to FIGS. 1-5.

Referring again to FIG. 7, the memory 750 may also store communication instructions 754 to facilitate communicating with one or more additional devices, one or more computers and/or one or more servers. The memory 750 may include graphical user interface instructions 756 to facilitate graphic user interface processing; sensor processing instructions 758 to facilitate sensor-related processing and functions; phone instructions 770 to facilitate phone-related processes and functions; electronic messaging instructions 772 to facilitate electronic-messaging related processes and functions; web browsing instructions 774 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 may store software instructions 772 to facilitate other processes and functions, such as the enhanced management features for digital media assets as described with reference to FIGS. 1-6.

Referring again to FIG. 7, the memory 750 may also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications may correspond to a set of instructions for performing one or more functions described above. These instructions need not be implemented as separate software programs, procedures, or modules. The memory 750 may include additional instructions or fewer instructions. Furthermore, various functions of the computing device 700 may be implemented in hardware and/or in software, including in one or more signal processing and/or application specific integrated circuits.

What is claimed is:

1. A method comprising:
   obtaining, by a user device associated with a user, from a server device, an original digital print asset published to the server device, the original digital print asset comprising first digital content, wherein the user is a purchaser of the original digital print asset;
   transferring ownership of the original digital print asset to the user;
   receiving, by the user device, a first input to add second digital content to the original digital print asset;
   generating, by the user device, a customized digital print asset comprising third digital content, the third digital content being based on the first digital content and the second digital content, wherein the third digital content of the customized digital print asset replaces the first digital content of the original digital print asset such that the original digital print asset can no longer be accessed or retrieved from the user device or the server device;

modifying, by the user device, a distributed ledger to include a hash of the third digital content and an association between the original digital print asset and the customized digital print asset; and publishing, by the user device, the customized digital print asset to the server device for distribution.

2. The method as recited in claim 1, wherein obtaining the original digital print asset comprises purchasing the original digital print asset through a first digital storefront hosted by the server device.

3. The method as recited in claim 2, wherein the first digital storefront is located remotely from the user device, and wherein the first digital storefront is accessed via a wireless interface of the computing device.

4. The method as recited in claim 1, wherein the third digital content of the customized digital print asset comprises a first indicator, the first indicator signifying a first time that the third digital content of the customized digital print asset is accessed by a user.

5. The method as recited in claim 1, further comprising:
decrypting, by the user device, the original digital print asset using a first private key accessible to the user device, wherein the decrypting is performed prior to generating the customized digital print asset.

6. The method as recited in claim 5, further comprising:
storing, by the user device, a first public key to the distributed ledger,
wherein the distributed ledger is configured to store, for each digital print asset accessible by the user device, an associated public key.

7. The method as recited in claim 5, further comprising encrypting, by the user device, the customized digital print asset using a second public key prior to publishing the customized digital print asset to the server device.

8. The method as recited in claim 1, further comprising:
generating, by the user device, a first block entry related to the customized digital print asset;
adding, by the user device, the first block entry to a blockchain related to the original digital print asset in response to generating the customized digital print asset; and
storing, by the user device, the blockchain to the distributed ledger.

9. The method as recited in claim 1, wherein modifying the distributed ledger further comprises adding a timestamp indicating a date and time of each change to the first digital content.

10. The method as recited in claim 1, wherein the second digital content is selected from a group consisting of: a signature of a person, annotations related to the first digital content, artwork related to the first digital content, and artwork related to the second digital content.

11. A non-transitory computer readable medium including one or more sequences of instructions that, when executed by one or more processors, cause the one or more processors to perform operations comprising:
obtaining, by a user device associated with a user, from a server device, an original digital print asset published to the server device, the original digital print asset comprising first digital content, wherein the user is a purchaser of the original digital print asset;

transferring ownership of the original digital print asset to the user;

receiving, by the user device, a first input to add second digital content to the original digital print asset;

generating, by the user device, a customized digital print asset comprising third digital content, the third digital content being based on the first digital content and the second digital content, wherein the third digital content of the customized digital print asset replaces the first digital content of the original digital print asset such that the original digital print asset can no longer be accessed or retrieved from the user device or the server device;

modifying, by the user device, a distributed ledger to include a hash of the third digital content and an association between the original digital print asset and the customized digital print asset; and publishing, by the user device, the customized digital print asset to the server device for distribution.

12. The non-transitory computer readable medium as recited in claim 11, wherein obtaining the original digital print asset comprises purchasing the original digital print asset through a first digital storefront hosted by the server device, wherein the first digital storefront is located remotely from the user device, and wherein the first digital storefront is accessed via a wireless interface of the user device.

13. The non-transitory computer readable medium as recited in claim 11, wherein the third digital content of the customized digital print asset comprises a first indicator, the first indicator signifying a first time that the third digital content of the customized digital print asset is accessed by a user.

14. The non-transitory computer readable medium as recited in claim 11, wherein the operations further comprise:
decrypting, by the user device, the original digital print asset using a first private key accessible to the computing device, wherein the decrypting is performed prior to generating the customized digital print asset.

15. The non-transitory computer readable medium as recited in claim 14, wherein the operations further comprise:
storing, by the user device, a first public key to the distributed ledger,
wherein the distributed ledger is configured to store, for each digital print asset accessible by the user device, an associated public key.

16. The non-transitory computer readable medium as recited in claim 14, wherein the operations further comprise encrypting, by the user device, the customized digital print asset using a second public key prior to publishing the customized digital print asset to the server device.

17. The non-transitory computer readable medium as recited in claim 11, wherein the operations further comprise:
generating, by the user device, a first block entry related to the customized digital print asset;
adding, by the user device, the first block entry to a blockchain related to the original digital print asset in response to generating the customized digital print asset; and
storing, by the user device, the blockchain to the distributed ledger.

18. The non-transitory computer readable medium as recited in claim 11, wherein modifying the distributed ledger comprises adding a timestamp indicating a date and time of each change to the first digital content.

19. The non-transitory computer readable medium as recited in claim 11, wherein the second digital content is selected from a group consisting of: a signature of a person, annotations related to the first digital content, artwork related to the first digital content, and artwork related to the second digital content.

20. A system comprising:

one or more processors; and a non-transitory computer readable medium including one or more sequences of instructions that, when executed by the one or more processors, cause the one or more processors to perform operations comprising:

obtaining, by a user device from a server device, an original digital print asset published to the server device, the original digital print asset comprising first digital content, wherein the user is a purchaser of the original digital print asset;

transferring ownership of the original digital print asset to the user;

receiving, by the user device, a first input to add second digital content to the original digital print asset;

generating, by the user device, a customized digital print asset comprising third digital content, the third digital content being based on the first digital content and the second digital content, wherein the third digital content of the customized digital print asset replaces the first digital content of the original digital print asset such that the original digital print asset can no longer be accessed or retrieved from the user device or the server device;

modifying, by the user device, a distributed ledger to include a hash of the third digital content and an association between the original digital print asset and the customized digital print asset; and publishing, by the user device, the customized digital print asset to the server device for distribution.

* * * * *